US 9,815,692 B2

(12) United States Patent
Ravikumar et al.

(10) Patent No.: US 9,815,692 B2
(45) Date of Patent: Nov. 14, 2017

(54) CONFIGURATIONS AND METHOD OF INTEGRATING A GAS TO LIQUIDS (GTL) PLANT IN A REFINERY

(71) Applicant: FLUOR TECHNOLOGIES CORPORATION, Aliso Viejo, CA (US)

(72) Inventors: Ravi Ravikumar, Lancaster, CA (US); Paul E. Koppel, Hollywood, FL (US); Sanjiv Dabee, Aliso Viejo, CA (US); Johnathon Zychowicz, Tustin, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 0 days.

(21) Appl. No.: 14/811,745

(22) Filed: Jul. 28, 2015

(65) Prior Publication Data

US 2016/0024401 A1 Jan. 28, 2016

Related U.S. Application Data

(60) Provisional application No. 62/030,000, filed on Jul. 28, 2014.

(51) Int. Cl.
*C10G 2/00* (2006.01)
*C01B 3/34* (2006.01)
(Continued)

(52) U.S. Cl.
CPC .................. *C01B 3/34* (2013.01); *C01B 3/38* (2013.01); *C01B 3/48* (2013.01); *C10G 2/32* (2013.01);
(Continued)

(58) Field of Classification Search
CPC ....... C01B 3/34; C01B 2203/062; C10G 2/32; C10G 47/00; C10G 2400/02;
(Continued)

(56) References Cited

U.S. PATENT DOCUMENTS

| 6,248,794 B1 * | 6/2001 | Gieskes | C01C 1/0488 |
| | | | 423/359 |
| 2005/0150820 A1 * | 7/2005 | Guo | C10G 2/32 |
| | | | 208/370 |

(Continued)

FOREIGN PATENT DOCUMENTS

| CA | 2751615 | 6/2014 |
| WO | 2014058907 | 4/2014 |

(Continued)

OTHER PUBLICATIONS

PCT Application No. PCT/US2015/042541, International Search Report, dated Oct. 13, 2015, 3 pages.
(Continued)

*Primary Examiner* — Randy Boyer
*Assistant Examiner* — Juan Valencia
(74) *Attorney, Agent, or Firm* — Conley Rose, P.C.

(57) ABSTRACT

A crude oil processing plant that comprises a Fischer-Tropsch reactor is disclosed. The crude oil processing plant comprises a crude oil processing section and a hydrogen production section. The hydrogen production section is coupled to a hydrocracker in the crude oil processing section to deliver a high purity hydrogen stream. The Fischer-Tropsch reactor receives a syngas stream from the hydrogen production section and produces a hydrocarbon stream. When light crude oil is processed, the hydrocracker typically has excess capacities to upgrade the hydrocarbon stream from the Fischer-Tropsch reactor.

17 Claims, 1 Drawing Sheet

(51) Int. Cl.

| | | |
|---|---|---|
| *C10L 10/12* | (2006.01) | |
| *C10G 47/00* | (2006.01) | |
| *C10K 1/00* | (2006.01) | |
| *C10K 3/04* | (2006.01) | |
| *C01B 3/38* | (2006.01) | |
| *C01B 3/48* | (2006.01) | |
| *C10L 1/04* | (2006.01) | |

(52) U.S. Cl.
CPC .............. *C10G 47/00* (2013.01); *C10K 1/005* (2013.01); *C10K 3/04* (2013.01); *C10L 1/04* (2013.01); *C10L 10/12* (2013.01); *C01B 2203/0216* (2013.01); *C01B 2203/0233* (2013.01); *C01B 2203/0283* (2013.01); *C01B 2203/043* (2013.01); *C01B 2203/0475* (2013.01); *C01B 2203/062* (2013.01); *C01B 2203/063* (2013.01); *C10G 2300/1022* (2013.01); *C10G 2400/02* (2013.01); *C10G 2400/04* (2013.01); *C10G 2400/08* (2013.01); *C10L 2270/026* (2013.01); *C10L 2270/04* (2013.01); *C10L 2290/148* (2013.01); *C10L 2290/42* (2013.01); *C10L 2290/541* (2013.01); *C10L 2290/542* (2013.01); *C10L 2290/543* (2013.01)

(58) Field of Classification Search
CPC ........ C10G 2300/1022; C10G 2400/04; C10G 2400/08; C10K 1/005; C10K 3/04; C10L 10/12; C10L 2290/543; C10L 2270/026; C10L 2270/04
See application file for complete search history.

(56) References Cited

U.S. PATENT DOCUMENTS

| | | | |
|---|---|---|---|
| 2006/0016722 A1 | 1/2006 | Espinoza et al. | |
| 2006/0138024 A1 | 6/2006 | Miller et al. | |
| 2012/0270957 A1* | 10/2012 | Kresnyak ................. | C10G 2/30 518/704 |
| 2013/0090393 A1* | 4/2013 | Bracht .................. | C07C 1/0485 518/702 |
| 2014/0097123 A1* | 4/2014 | Armistead ................ | C10L 3/12 208/85 |

FOREIGN PATENT DOCUMENTS

| | | | |
|---|---|---|---|
| WO | 2014095815 | | 6/2014 |
| WO | WO2014095815 | * | 6/2014 |
| WO | 2016018949 A1 | | 2/2016 |

OTHER PUBLICATIONS

PCT Application No. PCT/US2015/042541, Written Opinion of the International Searching Authority, dated Oct. 13, 2015, 7pages.
PCT Application No. PCT/US2015/042541, International Preliminary Report on Patentability, dated Jan. 31, 2017, 8 pages.
PCT Application No. PCT/US20151042541, International Search Report, dated Oct. 13, 2015, 3 pages.

* cited by examiner

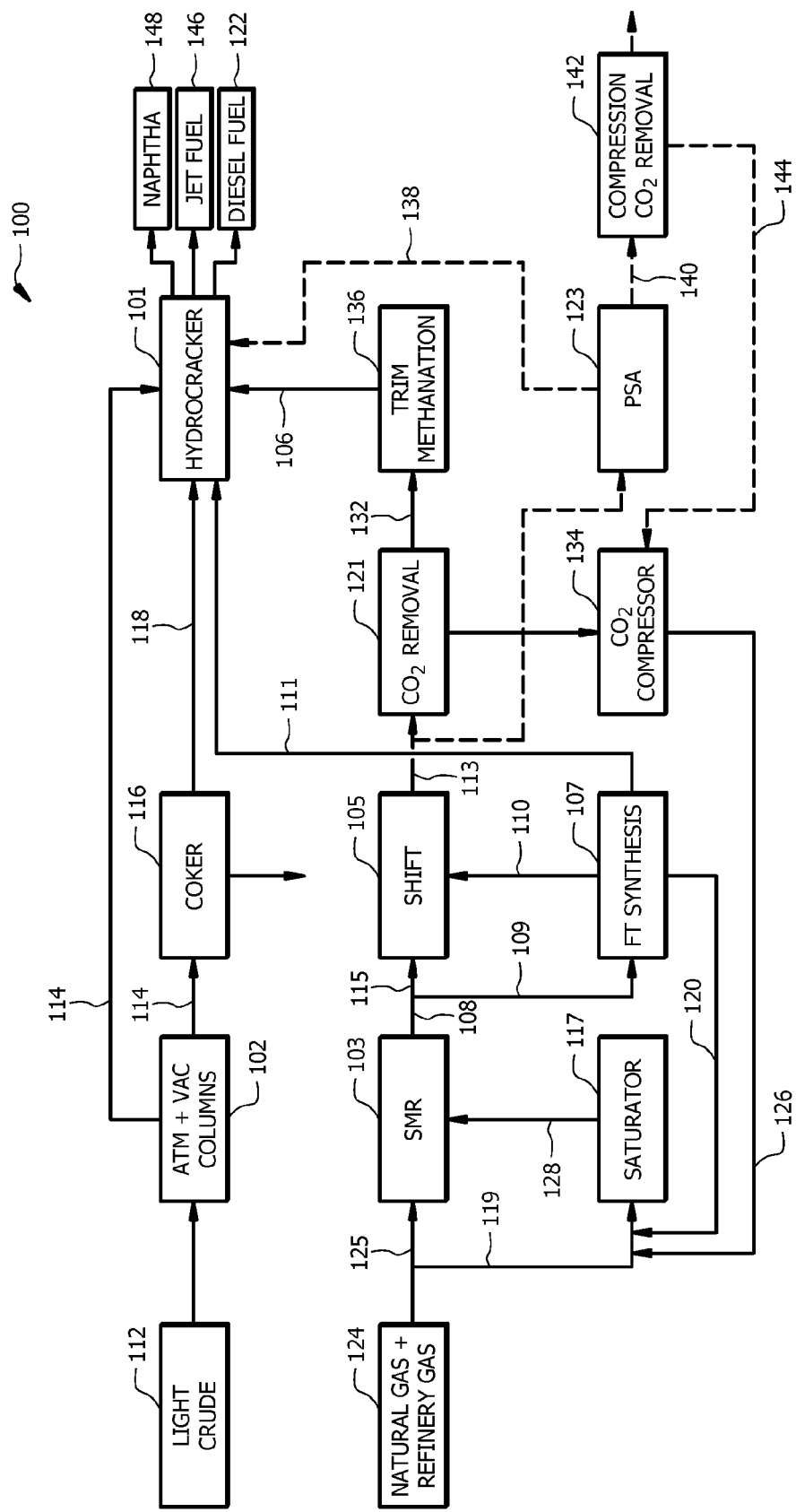

CONFIGURATIONS AND METHOD OF INTEGRATING A GAS TO LIQUIDS (GTL) PLANT IN A REFINERY

This application claims priority to U.S. Provisional Application Ser. No. 62/030,000, filed Jul. 28, 2014. All extrinsic materials identified herein are incorporated by reference in their entirety.

FIELD OF THE INVENTION

The field of the invention is the integration of gas-to-liquids ("GTL") processing within a refinery plant or crude oil processing plant, especially as it relates to plants that are designed to process heavy crude oils.

BACKGROUND

The background description includes information that may be useful in understanding the present invention. It is not an admission that any of the information provided herein is prior art or relevant to the presently claimed invention, or that any publication specifically or implicitly referenced is prior art.

Many refinery plants or crude oil processing plants are designed to use heavy crude oil as feedstock to produce various valuable products. While there are benefits in processing heavy crude oils, the low cost of light crude oil has created an attractive alternative. Unfortunately, the availability of these low-cost feedstocks has created a mismatch with existing plant design.

Additionally, or alternatively, hydrocarbon products can also be prepared from natural gas using a GTL plant via the Fischer-Tropsch process. A standalone GTL plant typically requires the following units: syngas preparation, Fischer-Tropsch reactor, product upgrading and all support utilities and offsite ("U&O") facilities. Consequently, the cost of a standalone GTL plant can be relatively high, and can be especially troublesome for small scale plants in terms of the cost per barrel per day.

Some have attempted to integrate a GTL plant with crude oil distillation. For example, Armistead (US 2014/0097123) discloses an integrated process facility for fractionating crude oil and converting gas-to-liquid. The process includes hydroprocessing fractionated products and Fischer-Tropsch products in the same hydroprocessor. Others that have discussed GTL plants or Fischer-Tropsch synthesis include Kresnyak (CA 2751615), Espinoza (US 2006/0016722), Miller (US 2006/0138024), Hoek (WO 2014/095815), and Armistead (WO 2014/058907). These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply. While each of these references has provided some benefit, there is still a need for a cost-effective integration of a GTL plant to produce Fischer-Tropsch liquid products.

SUMMARY OF THE INVENTION

The inventive subject matter provides apparatus, systems, and methods in which a crude oil processing plant can be more efficiently operated by utilizing a Fischer-Tropsch reactor. For example, a GTL plant can be integrated within an existing crude oil processing plant (e.g., a refinery) to make use of excess capacities, such as excess syngas and excess hydrocracking capacity. These excess capacities can be created when processing light crude oil in a crude oil processing plant that is designed for heavy crude oil. As used herein, the term "heavy crude oil" means any crude oil having an API gravity below 22.3° API (greater than 920 kg/m$^3$), and the term "light crude oil" means any crude oil having an API gravity higher than 31.1° API (less than 870 kg/m$^3$). In addition, high hydrogen crude oil can create excess capacities as described herein when processed in a crude oil processing plant that is designed for heavy crude oil. Thus, it should be appreciated that capital costs can be reduced by utilizing excess capacity from a crude oil processing plant.

In one aspect, a crude oil processing plant comprises a crude oil processing section and a hydrogen production section. The crude oil processing section includes a distillation unit and a hydrocracker. The hydrogen production section includes a steam methane reformer and a shift reactor and a $CO_2$ removal unit. The hydrogen production section is typically coupled to the hydrocracker to deliver a high purity hydrogen stream. A Fischer-Tropsch reactor is preferably coupled to the hydrogen production section and the crude oil processing section. For example, the Fischer-Tropsch reactor can be coupled to (i) the steam methane reformer that can be fed with $CO_2$ from the carbon dioxide removal unit to get a favorable $H_2/CO$ ratio of around two in the steam methane reformer product stream, and (ii) the hydrocracker to receive a first portion or all of a steam methane reformer product stream and produce a hydrocarbon stream to deliver to the hydrocracker and a tail gas stream to deliver to at least one of the existing shift reactor and the steam methane reformer.

In contemplated embodiments, the hydrocracker is configured to receive the hydrocarbon stream, the high purity hydrogen stream, and a fractionated crude oil from the distillation unit to produce a mixture of a naphtha, jet fuel, and a diesel product. When a diesel product is produced, it is contemplated that the hydrocracker is configured to produce the diesel product having a cetane number of at least 45. The ratios of naphtha, jet fuel, and diesel fuel can be varied by controlling the operating conditions of the hydrocracker.

It should be appreciated that the cetane number of a diesel product in the crude oil processing plant can be increased from 40 to at least 45 by feeding the hydrocarbon stream containing Fischer-Tropsch wax to the hydrocracker, which makes use of the excess hydrocracking capacity when processing a light crude oil instead of a heavy crude oil. Thus, the hydrocarbon stream can produce a cetane number when hydrocracked, such that it acts as a cetane booster when combined with the lower cetane product derived from the fractionated crude oil.

As mentioned above, the crude oil processing plant comprises a crude oil processing section. The crude oil processing section comprises a distillation column. It is contemplated that the distillation column can receive the light crude oil to produce the fractionated crude oil. In some embodiments, the distillation column comprises an atmospheric distillation column and a vacuum distillation column.

The crude oil processing plant can further comprise a saturator that is configured to receive a water stream from the Fischer-Tropsch reactor, a carbon dioxide stream from the hydrogen plant $CO_2$ removal unit, and a first portion of a feed gas to produce a mixed gas stream. In contemplated embodiments, the feed gas is at least one of a natural gas stream and a refinery gas stream. Contemplated carbon dioxide removal units include an amine absorption unit, hot potassium, carbonate scrubbing, and other suitable acid gas removal process. The steam methane reformer can receive the mixed stream and a second portion of the feed gas to produce the steam methane reformer product stream which could be a syngas for feed to a Fischer Tropsch reaction unit. It should be appreciated that the saturator reduces the steam requirement for the steam methane reformer by generating at least some steam required for steam methane reforming from the Fischer-Tropsch water stream. Additionally, the saturator also acts to recycle and destroy light oxygenates that are formed in the Fischer-Tropsch reactor.

The high purity hydrogen stream can be produced from the hydrogen production section using a variety of suitable techniques. In one example, the hydrogen production section includes a carbon dioxide removal unit that is configured to receive a shift reactor product stream to produce the carbon dioxide stream and a carbon dioxide removal unit product stream. Contemplated carbon dioxide removal units include an amine absorption unit, hot potassium, carbonate scrubbing, and other suitable acid gas removal process. In such example, a methanation reactor is typically configured to receive the carbon dioxide removal unit product stream to produce the high purity hydrogen stream with no carbon monoxide or carbon dioxide. In another example, the hydrogen production section includes a pressure swing adsorption unit that is configured to receive a shift reactor product stream from the shift reactor to produce the carbon dioxide stream and the high purity hydrogen stream.

In another aspect, a method of processing crude oil in a crude oil processing plant is contemplated. The crude oil processing plant comprises a crude oil processing section and a hydrogen production section. The crude oil processing section includes a distillation unit and a hydrocracker, and the hydrogen production section includes a steam methane reformer and a shift reactor. Typically, the hydrogen production section is coupled to the hydrocracker to deliver a high purity hydrogen stream. The method comprises fluidly coupling a Fischer-Tropsch reactor to the steam methane reformer, the shift reactor, and the hydrocracker. A first portion of a steam methane reformer product stream can be fed to a Fischer-Tropsch reactor to generate a hydrocarbon stream and a tail gas stream. The hydrocarbon stream can be fed to the hydrocracker, and the tail gas stream can be fed to at least one of the shift reactor and the steam methane reformer.

In contemplated embodiments, a mixture of naphtha, jet fuel, and a diesel product is generated via the hydrocracker, wherein the hydrocracker receives the hydrocarbon stream, the high purity hydrogen stream, and a fractionated crude oil from the distillation unit. It should be appreciated that feeding the hydrocarbon stream to the hydrocracker provides a Fischer-Tropsch wax to the hydrocracker in an amount effective to enhance a cetane number of the diesel product.

A water stream from the Fischer-Tropsch reactor, a carbon dioxide stream, and a first portion of a feed gas can be combined in a saturator to produce a mixed gas stream. The mixed gas stream and a second portion of the feed gas can be fed to the steam methane reformer to produce the steam methane reformer product gas. It should be appreciated that the mixed gas stream is fed in an amount effective to reduce a steam requirement for the steam methane reforming. In typical embodiments, the mixed gas stream comprises steam that is at least generated from water stream of the Fischer-Tropsch reactor.

It is also contemplated that carbon dioxide is removed from a shift reactor product stream in a carbon dioxide removal unit to produce the carbon dioxide stream and a carbon dioxide removal product stream, and the carbon dioxide removal product stream is fed to a methanation reactor to produce the high purity hydrogen stream. Alternatively, or additionally, contemplated embodiments separate carbon dioxide from a shift reactor product stream in a pressure swing adsorption unit to produce the carbon dioxide stream and the high purity hydrogen stream.

In yet another aspect, a method of retrofitting a heavy crude oil processing plant is contemplated. The heavy crude oil processing plant comprises a crude oil processing section and a hydrogen production section. The crude oil processing section includes a distillation unit and a hydrocracker, and the hydrogen production section includes a steam methane reformer and a shift reactor. Typically, the hydrogen production section is coupled to the hydrocracker to deliver a high purity hydrogen stream. The method of retrofitting comprises fluidly coupling a Fischer-Tropsch reactor to the steam methane reformer, the shift reactor, and the hydrocracker, wherein the Fischer-Tropsch reactor receives a first portion of a syngas stream to generate a hydrocarbon stream that is fed to the hydrocracker.

In other contemplated embodiments, the method comprises fluidly coupling a saturator to the Fischer-Tropsch reactor, a carbon dioxide source, a feed gas source, and the steam methane reformer, wherein the saturator receives a carbon dioxide stream from the carbon dioxide source, a water stream from the Fischer-Tropsch reactor, and a portion of a feed gas from the feed gas source to produce a mixed gas stream that is fed to the steam methane reformer. The steam methane reformer receives the mixed gas stream and a second portion of the feed gas to produce the syngas stream, and a second portion of the syngas stream is fed to the shift reactor.

Various objects, features, aspects and advantages of the inventive subject matter will become more apparent from the following detailed description of preferred embodiments, along with the accompanying drawing FIGURES in which like numerals represent like components.

BRIEF DESCRIPTION OF THE DRAWINGS

FIG. 1 is an exemplary configuration for a crude oil processing plant according to the inventive subject matter.

DETAILED DESCRIPTION

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The inventive subject matter provides apparatus, systems, and methods in which a GTL plant can be integrated with a crude oil processing plant to save capital cost by making use of excess capacity from the crude oil processing plant (and particularly hydrocracker capacity) when processing light oil crudes. The crude oil processing plant can comprise a crude oil processing section and a hydrogen production section. The crude oil processing section includes a distillation unit and a hydrocracker, and the hydrogen production section includes a steam methane reformer and a shift reactor. The hydrogen production section can be coupled to the hydrocracker to deliver a high purity hydrogen stream. A Fischer-Tropsch reactor can be coupled to at least one of the steam methane reformer, the shift reactor, and the hydrocracker, wherein the Fischer-Tropsch reactor is configured to receive a first portion of a steam methane reformer product stream and produce (i) a hydrocarbon stream to deliver to the hydrocracker and (ii) a tail gas stream to deliver to at least one of the shift reactor and the steam methane reformer. Thus, it should be appreciated that capital cost can be reduced by making use of excess capacity (e.g., excess syngas, excess hydrocracker capacity) within the crude oil processing plant, especially when processing lighter crude oil.

One should appreciate that the disclosed subject matter provides many advantageous technical effects including utilizing excess hydrocracking capacity to upgrade a hydrocarbon stream having Fischer-Tropsch wax to jet fuel and diesel products thus eliminating the need for new upgrade units. In combination with this benefit, the cetane number of the diesel product is improved due to the Fischer-Tropsch wax that is fed to the hydrocracker. In addition, the disclosed subject matter also utilizes excess syngas in a Fischer-Tropsch reactor that produces the hydrocarbon stream and a tail gas whereby the tail gas can be fed to a shift reactor to produce more hydrogen that can be used by the hydrocracker.

FIG. 1 shows an exemplary configuration for a crude oil processing plant 100 having an integrated GTL plant. Crude oil processing plant 100 has a crude oil processing section (comprising a hydrocracker 101 and a distillation column 102) and a hydrogen production section (comprising a steam methane reformer 103 and a shift reactor 105). The hydrogen production section is typically coupled to hydrocracker 101 to deliver a high purity hydrogen stream 106. Plant 100 further comprises a Fischer-Tropsch reactor 107 coupled to steam methane reformer 103, shift reactor 105, and hydrocracker 101. Fischer-Tropsch reactor 107 is configured to receive a first portion 109 of a steam methane reformer product stream 108 and produce a hydrocarbon stream 111 and a tail gas stream 110. Hydrocarbon stream 111 is delivered to hydrocracker 101 and tail gas stream 110 is delivered to shift reactor 105, typically when a pressure swing adsorption unit 123 is used for carbon dioxide removing. However, it is contemplated that tail gas stream 110 can be recycled to steam methane reformer 103, especially when carbon dioxide removal unit 121 is an amine absorber. Also, as used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Crude oil processing plant 100 is typically a refinery that is designed to process heavy crude oils. However, in other embodiments crude oil processing plant 100 is a refinery that is designed to process light crude oils. The crude oil processing section comprises distillation column 102 that is configured to receive at least one of a light crude oil and a heavy crude oil. In FIG. 1, a light crude oil 112 is received by distillation column to produce a fractionated crude oil 114. Distillation column 102 can comprise an atmospheric distillation column and a vacuum distillation column. Furthermore, the crude oil processing section can further comprise a coker 116 that receives a portion of fractionated crude oil 114 to produce a coker gas oil stream 118. It should be appreciated that excess capacity in hydrocracker 101 and the hydrogen plant (e.g., excess syngas) is created by processing a light crude oil 112 rather than a heavy crude oil. Suitable light crude oils 112 have a high K factor (i.e., a crude oil of predominantly paraffinic constituents) having a value of 12.5 or higher.

As discussed above, the hydrogen production section comprises steam methane reformer 103 and shift reactor 105. A Fischer-Tropsch reactor 107 is coupled to steam methane reformer 103 and receives a first portion 109 of a steam methane reformer product stream 108. Typically, steam methane reformer product stream 108 is syngas having a $H_2/CO$ ratio of about 2:1, which is used in Fischer-Tropsch reactors. Fischer-Tropsch reactor 107 generates tail gas stream 110, hydrocarbon stream 111, and a water stream 120 from steam methane reformer product stream 108. Tail gas stream 110 comprises residue gas from Fischer-Tropsch reactor 107 and is fed to shift reactor 105 to produce additional hydrogen.

Hydrocarbon stream 111 comprises hydrocarbon condensate and Fischer-Tropsch wax (i.e., a hydrocarbon wax) that is fed to hydrocracker 101. It should be appreciated that hydrocracker 101 has excess capacity created by processing light crude oil 112 in crude oil processing plant 100, which is typically designed for heavy crude oil. Thus, the excess capacity is utilized by feeding hydrocarbon stream 111 to hydrocracker 101 to upgrade hydrocarbon stream 111, which eliminates the need for new hydroprocessing units (e.g., hydrotreating and hydrocracking) to upgrade hydrocarbon stream 111. As described above, the presence of a Fischer-Tropsch wax in hydrocarbon stream 111 can improve the cetane number of a diesel product 122 generated by hydrocracker 101.

Water stream 120 from Fischer-Tropsch reactor 107 is fed to a saturator 117. Saturator 117 receives a first portion 119 of a feed gas 124 and a carbon dioxide stream 126 to produce a mixed gas stream 128. It is contemplated that mixed gas stream 128 comprises steam, methane and carbon dioxide. Mixed gas stream 128 and a second portion 125 of feed gas 124 are fed to steam methane reformer 103 to produce steam methane reformer product stream 108. Steam from mixed gas stream 128 reduces the steam requirement for steam methane reformer 103 resulting in a more efficient operation. Additionally, or alternatively, given that in typical embodiments mixed gas stream 128 contains carbon dioxide, it is contemplated that the steam methane reformer can be operated under conditions to allow reformation of carbon dioxide with methane to produce additional hydrogen.

The split between first portion 119 and second portion 125 of feed gas 124 can vary depending on a number of factors. For example, the ratio between first portion 119 and second portion 125 can increase as excess syngas or steam methane reformer product stream 108 increases in crude oil processing plant 100. In some embodiments, all of feed gas 124 is fed as second portion 125 to steam methane reformer 103 when there is no excess syngas. Alternatively, all of feed gas 124 can be fed as first portion 119 to saturator 117. It is contemplated that feed gas 124 is at least one of a refinery gas and a natural gas.

Steam methane reformer 103 generates steam methane reformer product stream 108 that can be split into first portion 109 and second portion 115. Similar to first portion 119 and second portion 125 of feed gas 124, the ratio between first portion 109 and second portion 115 of steam methane reformer product stream 108 can increase as excess syngas or steam methane reformer product stream 108 is generated. In some embodiments, all of steam methane reformer product stream 108 is fed to Fischer-Tropsch reactor 107 as first portion 109. In other embodiments, the steam methane reformer product stream 108 is split between first portion 109 and second portion 115.

First portion 119 and second portion 125 of feed gas 124, and first portion 109 and second portion 115 of steam methane reformer product stream 108 can be regulated by many suitable means. For example, valves can be used to manually or automatically adjust the flow of the various portions of feed gas 124 and steam methane reformer product stream 108. The valves can be coupled to sensors that analyze the feedstock (e.g., light crude oil, heavy crude oil) of the crude oil processing section and/or sensors that analyze streams within crude oil processing plant (e.g., to determine excess syngas). Thus, it is contemplated that crude oil plant 100 can transition between (i) a heavy crude oil mode where most, if not all, of feed gas 124 is fed as second portion 125 to steam methane reformer 103 and most, if not all, of steam methane reformer product stream 108 is fed as second portion 115 to shift reactor 105, and (ii) a light crude oil mode where excess capacities are exploited by feeding at least some of feed gas 124 as first portion 119 to saturator 117 and feeding at least some of steam methane reformer product stream 108 as first portion 109 to Fischer-Tropsch reactor 107.

Shift reactor 105 typically receives second portion 115 of steam methane reformer product stream 108 and tail gas stream 110 of Fischer-Tropsch reactor 107 and produces shift reactor product stream 113 comprising hydrogen and carbon dioxide. As discussed above, additional hydrogen can be generated from tail gas stream 110 in shift reactor 105. While hydrogen is produced in shift reactor 105 for hydrocracker 101, it is preferred that carbon dioxide is removed from shift reactor product stream 113.

The hydrogen production section can further comprise a carbon dioxide removal unit 121 that is configured to receive shift reactor product stream 113 to produce a carbon dioxide stream 126 and a carbon dioxide removal unit product stream 132. Thus, carbon dioxide removal unit 121 provides $CO_2$ removal from shift reactor product stream 113. Carbon dioxide stream 126 is fed to saturator 117. It is contemplated that carbon dioxide stream 126 is fed to a compressor 134 to compress carbon dioxide stream 126 to the pressure of saturator 117. It should be appreciated that feeding carbon dioxide stream 126 to steam methane reformer 103 via saturator 117 reduces the steam consumption in steam methane reformer 103 for producing a steam methane reformer product stream 108 having a $H_2/CO$ ratio of about 2:1. Additionally, use of carbon dioxide stream 126 within crude oil processing plant 100 can create a carbon offset for the refinery to add new processing units with new carbon emissions without the need to purchase carbon credit.

While carbon dioxide removal unit 121 functions as a $CO_2$ removal unit, it is contemplated that hydrogen production section further comprises a methanation reactor 136 to remove CO and residual $CO2$ from carbon dioxide removal unit product stream 132. Methanation reactor 136 can be a trim methanation reactor that is coupled downstream of carbon dioxide removal unit 121. Methanation reactor 136 receives carbon dioxide removal unit product stream 132 and produces high purity hydrogen stream 106, which is fed to hydrocracker 101.

While $CO_2$ removal using carbon dioxide removal unit 121 has been disclosed above, hydrogen production section can alternatively comprise a pressure swing adsorption unit 123 that removes $CO_2$ from shift reactor product stream 113 as shown by the dotted lines in FIG. 1. Pressure swing adsorption unit 123 is configured to receive a shift reactor product stream 113 from shift reactor 105 to produce a high purity hydrogen stream 138 and a pressure swing adsorption product stream 140. A carbon dioxide stream 144 is generated from pressure swing adsorption product stream 140 via a carbon dioxide removal unit 142 (e.g., amine absorption unit). Carbon dioxide stream 144 is fed to steam methane reformer 103 via saturator 117. It is contemplated that carbon dioxide stream 144 is compressed to the pressure of saturator 117. As noted above, use of carbon dioxide stream 144 within crude oil processing plant 100 can create a carbon offset for the refinery to add new processing units with new carbon emissions without the need to purchase carbon credit. Thus, it should be appreciated that carbon dioxide removal unit 121 or pressure swing adsorption unit 123 can be carbon dioxide sources that are utilized within crude oil processing plant 100.

Hydrocracker 101 receives high purity hydrogen stream from the hydrogen production section. For example, shift reactor 105 can be coupled to carbon dioxide removal unit 121 and methanation reactor 136 to produce high purity hydrogen stream 106. In an alternative example, shift reactor 105 can be coupled to pressure swing adsorption unit 123 to produce high purity hydrogen stream 138. Hydrocracker also receives hydrocarbon stream 111 and fractionated crude oil 114 and could produce a mixture of a naphtha product 148, a jet fuel product 146, and diesel product 122. As discussed above, hydrocracker 101 is configured to produce diesel product 122 having a cetane number of at least 45 due to the presence of Fischer-Tropsch wax in hydrocarbon stream 111. It should be appreciated that excess capacities in a catalytic reformer can also be exploited to upgrade naphtha product 148 for gasoline blending.

In another aspect, a method of processing crude oil in a crude oil processing plant having a crude oil processing section and a hydrogen production section is disclosed. The crude oil processing section comprises a distillation unit and a hydrocracker, and the hydrogen production section comprises a steam methane reformer and a shift reactor. The hydrogen production section is preferably coupled to the hydrocracker to deliver a high purity hydrogen stream.

The method comprises fluidly coupling a Fischer-Tropsch reactor to the steam methane reformer, the shift reactor, and the hydrocracker. A first portion of a steam methane reformer product stream can be fed to the Fischer-Tropsch reactor to generate a hydrocarbon stream and a tail gas stream. The hydrocarbon stream can be fed to the hydrocracker, and the tail gas stream to at least one of the shift reactor and a steam methane reformer. A mixture of a naphtha, jet fuel, and a diesel product can be generated via the hydrocracker using the hydrocarbon stream, the high purity hydrogen stream, and a fractionated crude oil from the distillation unit. It should be appreciated that the hydrocarbon stream provides Fischer-Tropsch wax to the hydrocracker in an amount sufficient to produce cetane enhancements.

In other embodiments, the method further comprises a saturator that produces a mixed gas stream by combining a water stream from the Fischer-Tropsch reactor, a carbon dioxide stream, and a first portion of a feed gas. It is contemplated that the mixed gas stream and a second portion of a feed gas are fed to the steam methane reformer to produce the steam methane reformer product gas. The mixed gas stream is preferably fed in an amount effective to reduce a steam requirement for the steam methane reforming.

The shift reactor produces a shift reactor product stream that comprises hydrogen and carbon dioxide. However, it is favorable to remove carbon dioxide prior to feeding the hydrogen generated by shift reactor to the hydrocracker. One contemplated method of removing carbon dioxide from a shift reactor product stream utilizes a carbon dioxide removal unit to receive the shift reactor product stream to produce the carbon dioxide stream and a carbon dioxide removal product stream. The carbon dioxide removal product stream can be fed to a methanation reactor to produce the high purity hydrogen stream. In another contemplated method, carbon dioxide can be removed from a shift reactor product stream by utilizing a pressure swing adsorption unit to receive the shift reactor product stream to produce the carbon dioxide stream and the high purity hydrogen stream.

In yet another method, a method of retrofitting a heavy crude oil processing plant having a crude oil processing section and a hydrogen production section is disclosed. The crude oil processing section comprises a distillation unit and a hydrocracker, and the hydrogen production section comprises a steam methane reformer and a shift reactor. The hydrogen production section is typically coupled to the hydrocracker to deliver a high purity hydrogen stream. The method of retrofitting the heavy crude oil processing plant comprises fluidly coupling a Fischer-Tropsch reactor to the steam methane reformer, the shift reactor, and the hydrocracker, wherein the Fischer-Tropsch reactor receives a first portion of a syngas stream to generate a hydrocarbon stream that is fed to the hydrocracker. It should be appreciated that by integrating the Fischer-Tropsch reactor into an existing crude oil processing plant, many excess capacities (e.g., excess syngas, excess hydrocracking capacity) can be exploited when processing light crude oil.

In a contemplated step, a saturator can be coupled to the Fischer-Tropsch reactor, a carbon dioxide source, a feed gas source, and the steam methane reformer. The saturator can receive a carbon dioxide stream from the carbon dioxide source, a water stream from the Fischer-Tropsch reactor, and a portion of a feed gas from the feed gas source to produce a mixed gas stream that is fed to the steam methane reformer. The steam methane reformer can receive the mixed gas stream and a second portion of the feed gas to produce the syngas stream, and a second portion of the syngas stream is fed to the shift reactor.

While excess capacities of syngas and hydroprocessing can be utilized to save capital costs as discussed above, it should be appreciated that another benefit of integrating a GTL plant in a crude oil processing plant is the ability to share common facilities within the crude oil processing plant. For example, some refinery support units that can be used by a Fischer-Tropsch reactor are waste water treatment of the stripped Fischer-Tropsch aqueous condensate, air/N2 system, buildings, steam, cooling water, electricity, raw water, product tankage, truck/rail road facilities and fire water supply. Additionally, while most of the excess capacities are generated when light crude oil is processed, it is contemplated that some benefits can also be achieved when heavy crude oil is processed in crude oil processing plant. While crude oil processing plant can be modified to integrate a GTL plant, such modified crude oil processing plants will typically retain the capability of processing heavy crude oils as desired.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A crude oil processing plant having a crude oil processing section and a hydrogen production section, wherein the crude oil processing section includes a distillation unit and a hydrocracker, wherein the hydrogen production section includes a steam methane reformer and a shift reactor, and wherein the hydrogen production section is coupled to the hydrocracker to deliver a high purity hydrogen stream, the plant comprising:

a Fischer-Tropsch reactor coupled to the steam methane reformer, and the hydrocracker, wherein the Fischer-Tropsch reactor is configured to receive a first portion of a steam methane reformer product stream and produce (i) a hydrocarbon stream to deliver to the hydrocracker and (ii) a tail gas stream to deliver to at least one of the shift reactor and the steam methane reformer; and a saturator that is configured to receive a water stream from the Fischer-Tropsch reactor, a carbon dioxide stream, and a first portion of a feed gas to produce a mixed gas stream.

2. The plant of claim 1, wherein the hydrocracker is configured to receive the hydrocarbon stream, the high purity hydrogen stream, and a fractionated crude oil from the distillation unit to produce a mixture of a naphtha, jet fuel, and a diesel product.

3. The plant of claim 2, wherein the hydrocracker is configured to produce the diesel product having a cetane number of at least 45.

4. The plant of claim 2, wherein the distillation column is configured to receive a light crude oil to produce the fractionated crude oil.

5. The plant of claim 1, wherein the steam methane reformer is configured to receive a second portion of the feed gas and the mixed stream to produce the steam methane reformer product stream.

6. The plant of claim 1, wherein the hydrogen production section comprises a carbon dioxide removal unit that is configured to receive a shift reactor product stream to produce the carbon dioxide stream and a carbon dioxide removal unit product stream, and wherein the steam methane reformer receives the tail gas.

7. The plant of claim 6, wherein the hydrogen production section comprises a methanation reactor configured to receive the carbon dioxide removal unit product stream to produce the high purity hydrogen stream.

8. The plant of claim 1, wherein the hydrogen production section comprises a pressure swing adsorption unit that is configured to receive a shift reactor product stream from the shift reactor to produce the carbon dioxide stream and the high purity hydrogen stream, and wherein the shift reactor receives the tail gas.

9. The plant of claim 1, wherein the feed gas is at least one of natural gas stream and a refinery gas stream.

10. A method of processing crude oil in a crude oil processing plant having a crude oil processing section and a hydrogen production section, wherein the crude oil processing section includes a distillation unit and a hydrocracker, wherein the hydrogen production section includes a steam thane reformer and a shift reactor, and wherein the hydrogen production section is coupled to the hydrocracker to deliver a high purity hydrogen stream, the method comprising:
fluidly coupling a Fischer-Tropsch reactor to the steam methane reformer, the shift reactor, and the hydrocracker;
feeding a first portion of a steam methane reformer product stream to the Fischer-Tropsch reactor to generate a hydrocarbon stream and a tail gas stream;
feeding the hydrocarbon stream to the hydrocracker, and the tail gas stream to at least one of the shift reactor and the steam methane reformer; and
combining a water stream from the Fischer-Tropsch reactor, a carbon dioxide stream, and a first portion of a feed gas in a saturator to produce a mixed gas stream.

11. The method of claim 10, further comprising generating a mixture of a naphtha, jet fuel, and a diesel product via the hydrocracker, wherein the hydrocracker receives the hydrocarbon stream, the high purity hydrogen stream, and a fractionated crude oil from the distillation unit.

12. The method of claim 11, wherein feeding the hydrocarbon stream to the hydrocracker comprises providing a Fischer-Tropsch wax in an amount effective to enhance a cetane number of the diesel product.

13. The method of claim 10, further comprising feeding the mixed gas stream and a second portion of a feed gas to the steam methane reformer to produce the steam methane reformer product gas, wherein the mixed gas stream is fed in an amount effective to reduce a steam requirement for the steam methane reformer.

14. The method of claim 10, further comprising removing carbon dioxide from a shift reactor product stream in a carbon dioxide removal unit to produce the carbon dioxide stream and a carbon dioxide removal product stream, and feeding the carbon dioxide removal product stream to a methanation reactor to produce the high purity hydrogen stream, and wherein the tail gas is fed to the steam methane reformer.

15. The method of claim 10, further comprising removing carbon dioxide from a shift reactor product stream in a pressure swing adsorption unit to produce the carbon dioxide stream and the high purity hydrogen stream, and wherein the tail gas is fed to the shift reactor.

16. A method of retrofitting a heavy crude oil processing plant having a crude oil processing section and a hydrogen production section, wherein the crude oil processing section includes a distillation unit and a hydrocracker, wherein the hydrogen production section includes a steam methane reformer and a shift reactor, and wherein the hydrogen production section is coupled to the hydrocracker to deliver a high purity hydrogen stream, the method comprising:
fluidly coupling a Fischer-Tropsch reactor to the steam methane reformer and the hydrocracker, wherein the Fischer-Tropsch reactor receives a first portion of a syngas stream to generate a hydrocarbon stream that is fed to the hydrocracker; and
fluidly coupling a saturator to the Fischer-Tropsch reactor, a carbon dioxide source, a feed gas source, and the steam methane reformer, wherein the saturator receives a carbon dioxide stream from the carbon dioxide source, a water stream from the Fischer-Tropsch reactor, and a portion of a feed gas from the feed gas source to produce a mixed gas stream that is fed to the steam methane reformer.

17. The method of claim 16, wherein the steam methane reformer receives the mixed gas stream and a second portion of the feed gas to produce the syngas stream, and a second portion of the syngas stream is fed to the shift reactor.

* * * * *

UNITED STATES PATENT AND TRADEMARK OFFICE
CERTIFICATE OF CORRECTION

PATENT NO.       : 9,815,692 B2
APPLICATION NO.  : 14/811745
DATED            : November 14, 2017
INVENTOR(S)      : Ravi Ravikumar et al.

Page 1 of 1

It is certified that error appears in the above-identified patent and that said Letters Patent is hereby corrected as shown below:

In the Drawings

Drawing sheet 1: insert --Figure 1--

In the Claims

Column 11, Line 37 Claim 10: "thane" should be "methane"

Signed and Sealed this
Sixteenth Day of January, 2018

Joseph Matal
*Performing the Functions and Duties of the*
*Under Secretary of Commerce for Intellectual Property and*
*Director of the United States Patent and Trademark Office*